United States Patent
Neuwald et al.

(10) Patent No.: US 6,879,668 B2
(45) Date of Patent: Apr. 12, 2005

(54) SYSTEM AND METHOD FOR COMMUNICATING WITH AN OUT OF SERVICE TELEPHONE NUMBER

(75) Inventors: Peter Robert Neuwald, Milwaukee, WI (US); Nancy Ann Book, Naperville, IL (US); Thomas Joseph McBlain, Arlington Heights, IL (US); William M. Moy, Wheeling, IL (US); Carol Shifrin Gruchala, Naperville, IL (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

(21) Appl. No.: 10/136,838

(22) Filed: May 1, 2002

(65) Prior Publication Data

US 2003/0206618 A1 Nov. 6, 2003

(51) Int. Cl.[7] ............................................. H04M 11/00
(52) U.S. Cl. ................. 379/93.24; 379/88.17; 379/88.23
(58) Field of Search .................. 379/93.24, 90.01, 379/88.17, 88.12, 88.13, 88.23, 67; 709/204, 206, 207, 227, 228

(56) References Cited

U.S. PATENT DOCUMENTS

| | | | |
|---|---|---|---|
| 4,996,704 A | * | 2/1991 | Brunson .................. 379/88.19 |
| 5,222,128 A | | 6/1993 | Daly et al. |
| 5,420,917 A | | 5/1995 | Guzman |
| 5,440,620 A | | 8/1995 | Slusky |
| 5,465,294 A | | 11/1995 | Chapman, Jr. et al. |
| 5,473,143 A | | 12/1995 | Vak et al. |
| 5,710,803 A | | 1/1998 | Kowal et al. |
| 5,844,974 A | | 12/1998 | Ichikawa |
| 6,002,748 A | | 12/1999 | Leichner |
| 6,233,318 B1 | * | 5/2001 | Picard et al. ............ 379/88.17 |
| 6,374,223 B1 | | 4/2002 | Donaldson et al. |

OTHER PUBLICATIONS

Copy of web site page http://www.verizon-uc.com/home/details_works.htm?state=VA.

* cited by examiner

Primary Examiner—Melur Ramakrishnaiah
(74) Attorney, Agent, or Firm—Bruce E. Stuckman; Cardinal Law Group

(57) ABSTRACT

A method for communicating with a subscriber having a first telephone number that is out-of-service comprises providing a database that is accessible at least through a second telephone number, and allowing the subscriber to access the database to post a message. The message is made available to an interested party. A system for a subscriber to communicate with an interested party is also provided.

22 Claims, 2 Drawing Sheets

SYSTEM AND METHOD FOR COMMUNICATING WITH AN OUT OF SERVICE TELEPHONE NUMBER

TECHNICAL FIELD OF THE INVENTION

This invention relates generally to communication systems, and more particularly to a system and method for communicating with an out-of-service telephone number.

BACKGROUND OF THE INVENTION

Telephone calls remain a desirable manner of communication despite the proliferation of alternative mediums. Because a called party is not always available to answer a call, a variety of methods have been developed to record messages intended for the called party. Answering machines, voice mail systems, and to a lesser extent answering services are all well known to modern telephone users. All of these systems, however, require that the called telephone number be operational.

Telecommunication systems have also been proposed to address situations in which circuits are unavailable to complete a telephone call. For example, U.S. Pat. No. 5,844,974 shows an emergency telephone communications system that allows communications during congestion in the event of disaster. This patent suggests that when exchanges are overloaded due to simultaneous calling by a majority of subscribers during emergency situations, the subscribers may send messages about their safety to important parties.

BRIEF DESCRIPTION OF THE DRAWING

The objects, features and advantages of the present invention are readily apparent from the following detailed description of the best mode for carrying out the invention when taken in conjunction with the accompanying drawings, in which.

DETAILED DESCRIPTION OF THE PRESENTLY PREFERRED EMBODIMENTS

As is well known, a telephone number may become non-operational for a variety of reasons ranging from the benign to the more serious. In any event, systems incorporating teaching of the present invention provide a method for communicating with an out-of-service telephone number. A message database is provided, as shown at block 10 in FIG. 1. The message database may be any conventional storage medium, and is accessible via telephone, electronic mail (e-mail), and the Internet, as discussed more fully below.

A subscriber to the system may access the message database at any time in order to post messages, as shown at block 12. These messages are preferably in the form of voice or text. In the former case, the voice message may be recorded by the system in either analog or digital form. The subscriber may also choose to post a "canned" voice or text message prerecorded by the system. The posted message, whether recorded by the subscriber or provided by the system, may indicate for example that the subscriber is safe. It should be appreciated, of course, that the subscriber can update or delete his message(s) at any time. Access to this function is preferably protected, either by a personal identification number in the case of telephone access or by a password in the case of Internet access.

Figure 1:
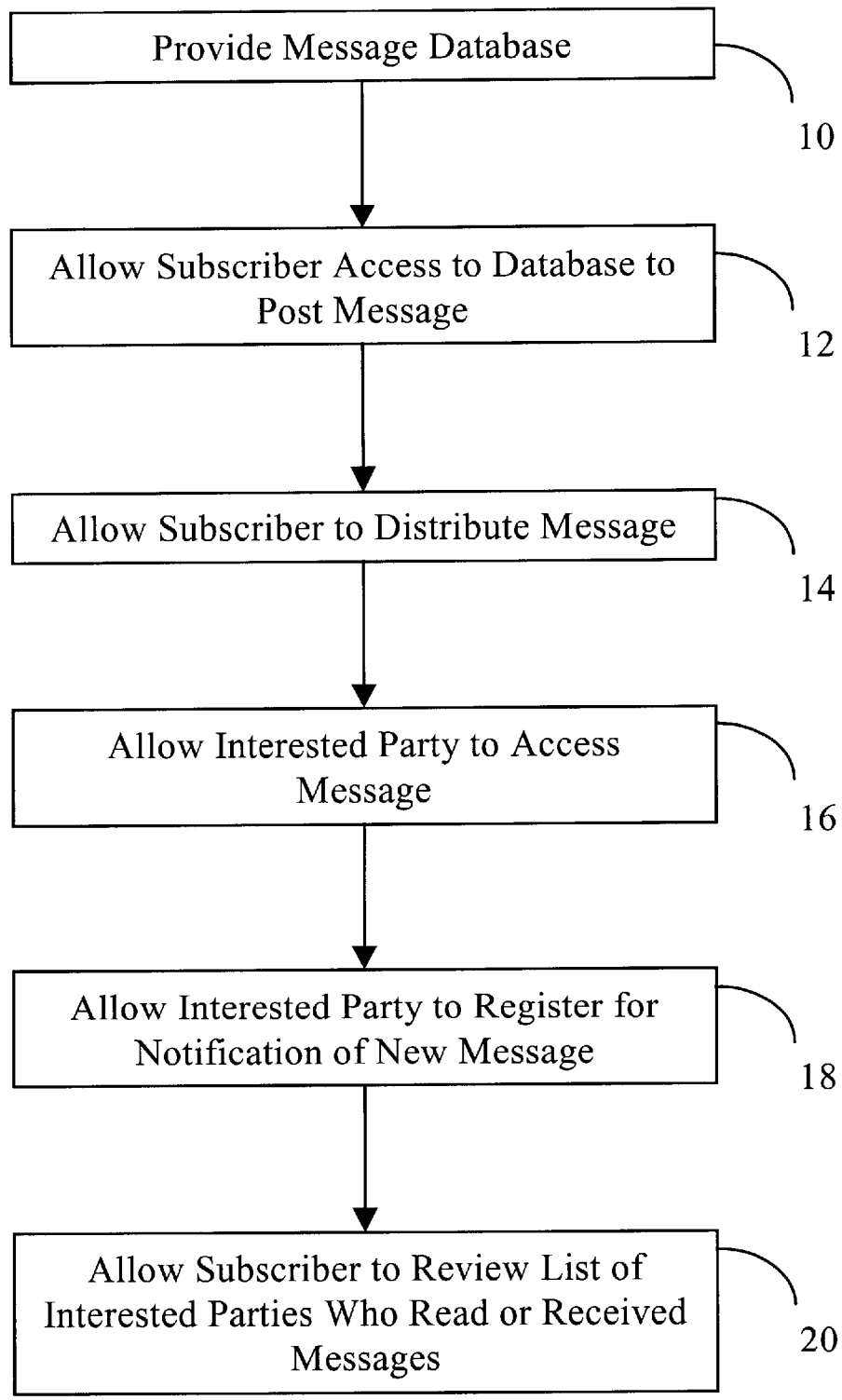
FIG. 1 is a flow chart showing a method according to the present invention for communicating with an out-of-service telephone number.

The subscriber may also choose to distribute a message, as indicated by the block 14 in FIG. 1. This distribution may be by telephone, e-mail, or an Internet page either generally accessible or accessible only with proper authentication such as a password. The subscriber may either access an existing distribution list which he has previously created, modify such a preexisting distribution list, or create an entirely new distribution list for a particular occasion. For textual messages, these distribution lists preferably contain multiple e-mail addresses. The system may also deliver text messages by telephone to cellular telephones and pagers enabled to receive them, or to any other electronic devices capable of receiving text-based messages. For voice messages, the distribution lists may simply be telephone numbers that the system dials and then plays the subscriber message.

In the absence of or in addition to notification by the system, interested parties may access the system as indicated by the block 16. An interested party may thus dial a general, published telephone number and navigate a directory in order to find messages left by an individual subscriber. Alternatively, the subscriber may disseminate a direct telephone number "mailbox" assigned to him, or may more generally publish his individual direct number. Still another alternative is to route calls originally placed to the subscriber's out-of-service telephone number to the message system. Instead of telephone access, the interested party may access and navigate a general Internet site, or may visit a more personal Internet address or "home page" previously disseminated by the subscriber. In any case, the interested party thus gains access to the relevant data in order to check messages left by the subscriber.

Interested parties may also register for notification when new messages are posted by a subscriber, as indicated by the block 18. Such notification may be by e-mail, voice message or pager, and may be in lieu of or in addition to distribution of the message itself. Thus, a subscriber may choose to allow notice of the posting of a new message to all interested parties, who then must access a restricted access web page in order to view the message.

The subscriber may review a list of interested parties who read or received his messages, as shown by block 20. The subscriber may disable, either generally or in a limited fashion, the ability for others to register to receive information from the system. Alternatively, the system may automatically notify the subscriber of the identity of any person who accesses the subscriber's message, as well as the time and other particulars of the access.

Figure 2:
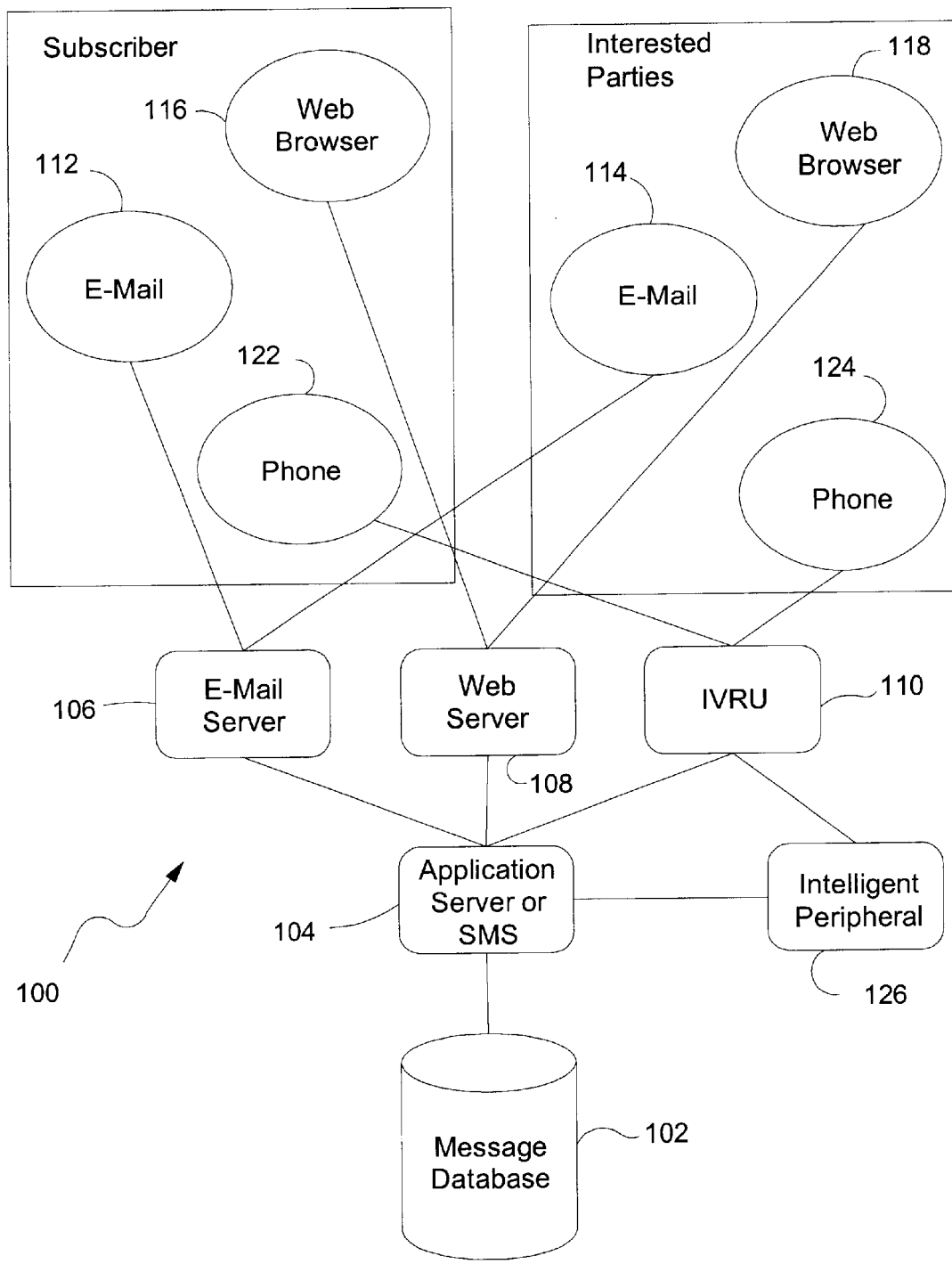
FIG. 2 shows a schematic view of a system according to the present invention for implementing the method.

FIG. 2 shows one embodiment 100 of a system for implementing the present invention. The system 100 includes a message database 102 and a service management system (SMS) 104. The SMS 104 is preferably a UNIX-based service of the type commonly found in advanced intelligent networks, but it should be appreciated that any application server adapted for the purpose of managing the message database may be used. The SMS 104 corresponds with an e-mail server 106, an Internet web server 108, and an interactive voice recognition unit (IVRU) 110.

The e-mail server 106 manages e-mail to and from the subscriber's e-mail interface 112, and also manages e-mail to and from an e-mail interface 114 of any given interested party. The web server 108 likewise manages Internet traffic to and from the subscriber's web browser 116, and manages Internet traffic to and from a web browser 118 of an interested party. The IVRU 110 performs a similar function for managing telephone traffic to and from the telephones 122 and 124, respectively, of the subscriber and the interested party. In particular, the IVRU 110 provides a conventional directory-type, touch-tone prompt interface for telephone access to the message database 102. An intelligent peripheral 126 may also be provided in communication between the IVRU 110 and the SMS 104. In a preferred embodiment, the intelligent peripheral 126 provides a speech recognition function. This is particularly useful for transcribing voice messages from the subscriber into textual messages for distribution by the system 100, but the IVRU may also convert text messages into voice messages for distribution.

The message database 102 and its various servers are preferably located at a remote site to minimize the possibility of their physical damage. To further diminish this possibility, the present invention also contemplates that two or more synchronized message databases may be separately located.

Systems incorporating the teachings of the present invention thus provide a method that allows subscribers to communicate with interested parties in the event that the subscriber's telephone number is out-of-service. Such systems also provide a method by which interested parties can obtain information about the subscriber in the event of an emergency or disaster. By allowing both subscribers and interested parties to access a common database of information via a variety of diverse communication systems, the likelihood of being able to send and receive messages is greatly improved. The present invention also decreases the loading on communication systems, by reducing unnecessary telephone calls that is typical in cases of a widespread disaster.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A method for communicating with a subscriber, the method comprising:

determining that the subscriber has a first telephone number that is out-of-service, providing a database that is accessible at least through a second telephone number;

allowing the subscriber to access the database to post a message; and making the message available to an interested party.

2. The method of claim 1 wherein the message is a voice message.

3. The method of claim 1 wherein the message is an electronic mail message.

4. The method of claim 1 wherein the message is posted through the second telephone number.

5. The method of claim 1 wherein the message is posted via the Internet.

6. The method of claim 1 wherein making the message available comprises distributing the message to the interested party.

7. The method of claim 1 wherein making the message available comprises allowing the interested party to retrieve the message.

8. The method of claim 7 wherein the interested party retrieves the message through the second telephone number.

9. The method of claim 7 wherein the interested party retrieves the message through electronic mail.

10. The method of claim 7 wherein the interested party retrieves the message via the Internet.

11. A method of establishing communicating between a subscriber and an interested party, the method comprising:

determining that the subscriber has a first telephone number that is temporarily out-of-service;

providing a database that is accessible at least through a second telephone number;

allowing the subscriber to access the database to post a message; and distributing the message to the interested party.

12. The method of claim 11 wherein the message is a voice message.

13. The method of claim 11 wherein the message is an electronic mail message.

14. The method of claim 11 wherein the message is posted through the second telephone number.

15. The method of claim 11 wherein the message is posted through the Internet.

16. A system for a subscriber to communicate with an interested party, the system comprising:

a database that is accessible at least through a second telephone number, the subscriber having a first telephone number that is out-of-service;

means for allowing the subscriber to access the database to post a message; and means for making the message available to the interested party.

17. The system of claim 16 wherein the means for allowing the subscriber scriber to access the database comprises a telephone.

18. The system of claim 16 wherein the means for allowing the subscriber to access the database comprises the Internet.

19. The system of claim 16 wherein the means for making the message available comprises an interactive voice recognition unit.

20. The system of claim 16 wherein the means for making the message available comprises the Internet.

21. The system of claim 16 wherein the means for making the message available comprises an electronic mail server.

22. The system of claim 16 further comprising an intelligent peripheral in communication with the database.

* * * * *